United States Patent
Shih et al.

(10) Patent No.: US 9,341,902 B2
(45) Date of Patent: May 17, 2016

(54) FANOUT ZONE STRUCTURE OF SLIM-BEZEL LIQUID CRYSTLA DISPLAY

(71) Applicant: Shenzhen China Star Optoelectronics Technology Co., Ltd., Shenzhen, Guangdong (CN)

(72) Inventors: Minghung Shih, Guangdong (CN); Zuomin Liao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 110 days.

(21) Appl. No.: 14/349,331

(22) PCT Filed: Jan. 22, 2014

(86) PCT No.: PCT/CN2014/071156
§ 371 (c)(1),
(2) Date: Apr. 2, 2014

(87) PCT Pub. No.: WO2015/096256
PCT Pub. Date: Jul. 2, 2015

(65) Prior Publication Data
US 2015/0185577 A1   Jul. 2, 2015

(30) Foreign Application Priority Data
Dec. 27, 2013   (CN) .......................... 2013 1 0733592

(51) Int. Cl.
*G02F 1/1333* (2006.01)
*G02F 1/1362* (2006.01)
*G02F 1/1343* (2006.01)
*G02F 1/1345* (2006.01)

(52) U.S. Cl.
CPC ........ *G02F 1/136286* (2013.01); *G02F 1/1345* (2013.01); *G02F 1/13439* (2013.01); *G02F 1/133345* (2013.01)

(58) Field of Classification Search
CPC ................... G02F 1/133345; G02F 1/136227; G02F 1/13452; G02F 1/136286; G02F 1/13439; G02F 1/1345
USPC ......................................... 349/138, 149–152
See application file for complete search history.

(56) References Cited

U.S. PATENT DOCUMENTS

2008/0272388 A1* 11/2008 Ushiyama et al. ...... H01L 27/12
257/98
2011/0090436 A1* 4/2011 Choi ................... G02F 1/13306
349/106

FOREIGN PATENT DOCUMENTS

| CN | 1738495 A | 2/2006 |
|---|---|---|
| CN | 102033646 A | 4/2011 |

(Continued)

*Primary Examiner* — Nathanael R Briggs
*Assistant Examiner* — William Peterson
(74) *Attorney, Agent, or Firm* — Andrew C. Cheng

(57) ABSTRACT

The present invention provides a fanout zone structure of a slim-bezel liquid crystal display, including: a transparent substrate (22), a first metal layer (24) formed on the transparent substrate (22), an insulation layer (26) formed on the first metal layer (24), a second metal layer (27) formed on the insulation layer (26), and a protection layer (28) formed on the second metal layer (27). The first metal layer (24) is electrically connected to the second metal layer (27). The insulation layer (26) includes a first opening (31) formed therein to expose the first metal layer (24). The protection layer (28) includes a second opening (32) formed therein to expose the second metal layer (27). The second opening (32) is arranged to correspond to the first opening (31) so as to form a trough (14) in the fanout zone.

15 Claims, 3 Drawing Sheets

FANOUT ZONE STRUCTURE OF SLIM-BEZEL LIQUID CRYSTLA DISPLAY

BACKGROUND OF THE INVENTION

1. Field of the Invention

The present invention relates to the field of liquid crystal display technology, and in particular to a fanout zone structure of a liquid crystal display.

2. The Related Arts

Liquid crystal displays have a variety of advantages, such as thin device body, low power consumption, and being free of radiation, and are thus widely used. Most of the liquid crystal displays that are currently available in the market are backlighting liquid crystal displays, which comprise a liquid crystal panel and a backlight module. The operation principle of the liquid crystal panel is that, with liquid crystal molecules interposed between two parallel glass substrates, a driving voltage is applied to the two glass substrates to control the rotation direction of the liquid crystal molecules in order to refract out light emitting from the backlight module for generating images. Since the liquid crystal panel does not emit light by itself, light must be provided from the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to form a planar light source for the liquid crystal display panel.

With the development of the liquid crystal display technology, users have severer and severer requirements for the performance and outside looking of the liquid crystal displays, wherein the distance from an effective displaying zone of a liquid crystal display panel to an edge of the panel (namely bezel width) is made increasingly smaller. However, due to various factors, such as polyimide (PI) coating processes (alignment film coating processes), it is generally hard to make the bezel width smaller. In the known techniques, to reduce the bezel width, in the color filter substrate portion, a photo spacer (PS) layer is used to prevent outward flowing of polyimide and, in the array substrate portion, two layers of metal films are stacked in the circumference to form a step for preventing outward flowing of polyimide. However, in a fanout zone (which is the area where display zone signal lines are connected to drivers), a plurality of signal lines is formed and the signal lines themselves need two layers of metal films so that it is not possible to stack metal films in the fanout zone for forming a step to prevent outward flowing of polyimide.

SUMMARY OF THE INVENTION

An object of the present invention is to provide a fanout zone structure of a slim-bezel liquid crystal display, in which with continuity of a first metal layer being preserved, remaining layers are etched off to form a step for preventing outward flowing of polyimide to thereby achieve the purposes of reducing bezel width, providing a liquid crystal display panel with a more aesthetic outside appearance, and thus improving competition power of a liquid crystal display panel product.

To achieve the above object, the present invention provides a fanout zone structure of a slim-bezel liquid crystal display, which comprises: a transparent substrate, a first metal layer formed on the transparent substrate, an insulation layer formed on the first metal layer, a second metal layer formed on the insulation layer, and a protection layer formed on the second metal layer. The first metal layer is electrically connected to the second metal layer. The insulation layer comprises a first opening formed therein to expose the first metal layer. The protection layer comprises a second opening formed therein to expose the second metal layer. The second opening is arranged to correspond to the first opening so as to form a trough in the fanout zone.

The transparent substrate is a glass substrate or a plastic substrate.

The first metal layer comprises gate lines of signal lines of the slim-bezel liquid crystal display formed therein and the second metal layer comprises data lines of the signal lines of the slim-bezel liquid crystal display formed therein.

The second metal layer is formed on the insulation layer and the first metal layer. The second metal layer extends through the first opening to directly contact the first metal layer so as to achieve electrical connection between the first metal layer and the second metal layer.

The fanout zone structure of the slim-bezel liquid crystal display further comprises a transparent conductive layer formed on the protection layer and the second metal layer.

The transparent conductive layer is formed of indium tin oxides.

The second metal layer comprises a third opening formed therein to correspond to the first opening and the transparent conductive layer extends sequentially through the second opening, the third opening, and the first opening to contact the first metal layer.

The transparent conductive layer comprises a fourth opening formed therein to correspond to the first to third openings so as to increase depth of the trough.

The transparent substrate comprises a first ditch formed therein. The first metal layer comprises a second ditch formed therein to correspond to the first ditch. The first and second ditches re arranged to correspond to and located under the first to fourth openings so as to increase the depth of the trough.

The second metal layer comprises a third opening formed therein to correspond to the first opening and the fanout zone structure further comprises a transparent conductive layer formed on the protection layer, the second metal layer, the insulation layer, and the first metal layer. The first metal layer, the insulation layer, the second metal layer, and the protection layer are sequentially formed on the transparent substrate. The transparent conductive layer extends sequentially through the second opening, the third opening, and the first opening to contact the first metal layer so as to electrically connect the second metal layer to the first metal layer.

The present invention also provides a fanout zone structure of a slim-bezel liquid crystal display, which comprises: a transparent substrate, a first metal layer formed on the transparent substrate, an insulation layer formed on the first metal layer, a second metal layer formed on the insulation layer, and a protection layer formed on the second metal layer, the first metal layer being electrically connected to the second metal layer, the insulation layer comprising a first opening formed therein to expose the first metal layer, the protection layer comprising a second opening formed therein to expose the second metal layer, the second opening being arranged to correspond to the first opening so as to form a trough in the fanout zone;

wherein the transparent substrate is a glass substrate or a plastic substrate;

wherein the first metal layer comprises gate lines of signal lines of the slim-bezel liquid crystal display formed therein and the second metal layer comprises data lines of the signal lines of the slim-bezel liquid crystal display formed therein;

wherein the second metal layer is formed on the insulation layer and the first metal layer, the second metal layer extending through the first opening to directly contact the first metal layer so as to achieve electrical connection between the first metal layer and the second metal layer; and further comprising a transparent conductive layer formed on the protection layer and the second metal layer.

The transparent conductive layer is formed of indium tin oxides.

The second metal layer comprises a third opening formed therein to correspond to the first opening and the transparent conductive layer extends sequentially through the second opening, the third opening, and the first opening to contact the first metal layer.

The transparent conductive layer comprises a fourth opening formed therein to correspond to the first to third openings so as to increase depth of the trough.

The transparent substrate comprises a first ditch formed therein. The first metal layer comprises a second ditch formed therein to correspond to the first ditch. The first and second ditches are arranged to correspond to and located under the first to fourth openings so as to increase the depth of the trough.

The efficacy of the present invention is that the present invention provides a fanout zone structure of a slim-bezel liquid crystal display, in which under the condition that continuity of at least the first metal layer is preserved, one or more troughs are used to prevent outward flowing of polyimide. In other words, etching is applied at the site of the trough to remove the remaining layers in order to form a step that prevents outward flowing of polyimide so as to achieve the purposes of reducing bezel width, providing a liquid crystal display panel with a more aesthetic outside appearance, and thus improving competition power of a liquid crystal display panel product.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to preferred embodiments of the present invention and the attached drawings.

Figure 1:
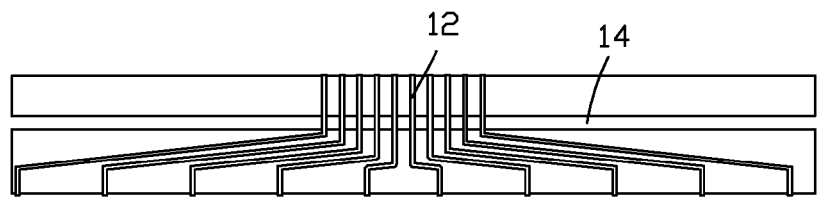
FIG. 1 is a plan view showing a fanout zone structure of a slim-bezel liquid crystal display according to the present invention.
Figure 2:
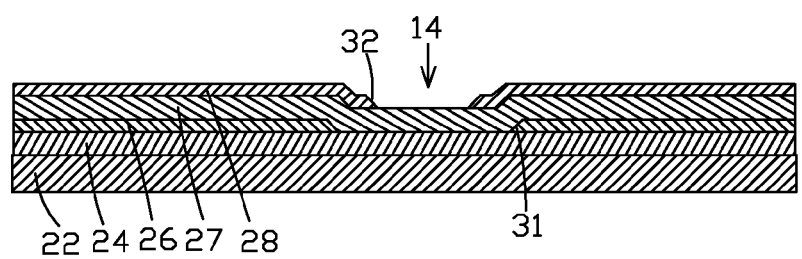
FIG. 2 is a schematic view showing a first embodiment of the fanout zone structure of the slim-bezel liquid crystal display according to the present invention.

Referring to FIGS. 1 and 2, FIG. 1 is a plan view showing a fanout zone structure of a slim-bezel liquid crystal display according to the present invention and FIG. 2 is a schematic view showing a first embodiment of the fanout zone structure of the slim-bezel liquid crystal display according to the present invention. The present invention provides a fanout zone structure of a slim-bezel liquid crystal display, which comprises: a transparent substrate 22, a first metal layer 24 formed on the transparent substrate 22, an insulation layer 26 formed on the first metal layer 24, a second metal layer 27 formed on the insulation layer 26, and a protection layer 28 formed on the second metal layer 27. The first metal layer 24 is electrically connected to the second metal layer 27. The insulation layer 26 comprises a first opening 31 formed therein to expose the first metal layer 24. The protection layer 28 comprises a second opening 32 formed therein to expose the second metal layer 27. The second opening 32 is arranged to correspond to the first opening 31 so as to form a trough 14 in the fanout zone. The trough 14 is used to prevent outward flowing of polyimide so as to achieve the purposes of reducing bezel width, providing a liquid crystal display panel with a more aesthetic outside appearance, and thus improving competition power of a liquid crystal display panel.

In the instant embodiment, the second metal layer 27 is formed on the insulation layer 26 and the first metal layer 24 so that the second metal layer 27 extends through the first opening 31 to directly contact the first metal layer 24 for achieve electrical connection between the first metal layer 24 and the second metal layer 27.

The transparent substrate 22 can be a glass substrate or a plastic substrate and is preferably a glass substrate.

The first metal layer 24 forms gate lines of signal lines 12 of the slim-bezel liquid crystal display. The second metal layer 27 forms data lines of the signal lines 12 of the slim-bezel liquid crystal display.

Figure 3:
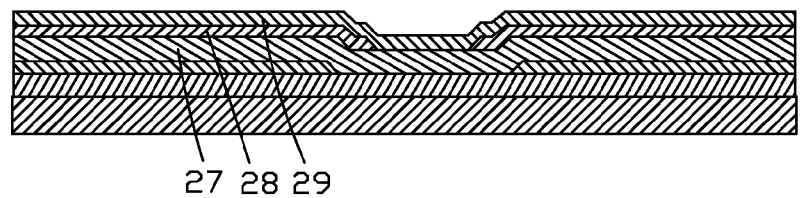
FIG. 3 is a schematic view showing a second embodiment of the fanout zone structure of the slim-bezel liquid crystal display according to the present invention.

Referring to FIG. 3, which is a schematic view showing a second embodiment of the fanout zone structure of the slim-bezel liquid crystal display according to the present invention, the instant embodiment is modified by adding a transparent conductive layer 29 on the first embodiment to protect the exposed portion of the second metal layer. The transparent conductive layer 29 is formed on the protection layer 28 and the second metal layer 27.

The first transparent conductive layer 29 is preferably formed by depositing indium tin oxides.

Figure 4:
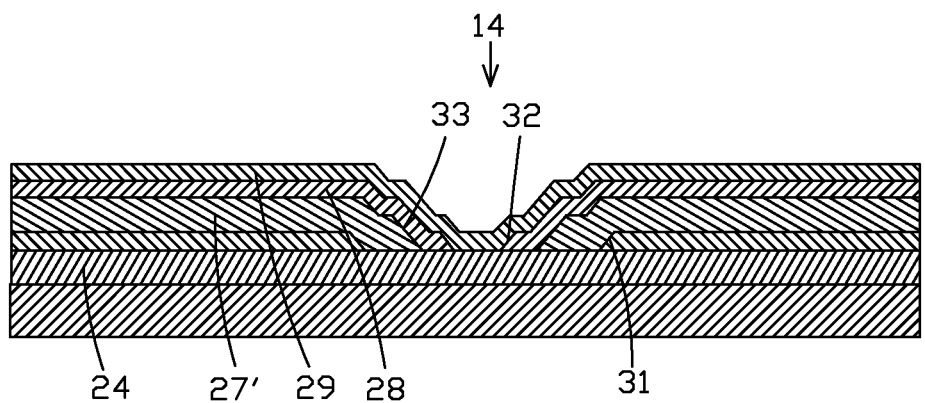
FIG. 4 is a schematic view showing a third embodiment of the fanout zone structure of the slim-bezel liquid crystal display according to the present invention.

Referring to FIG. 4, which is a schematic view showing a third embodiment of the fanout zone structure of the slim-bezel liquid crystal display according to the present invention, the instant embodiment comprises modification of the second metal layer 27 on the basis of the second embodiment in order to provided improved effect of preventing outward flowing of polyimide. In other words, the second metal layer 27' comprises a third opening 33 formed therein to correspond to the first and second openings 31, 32 in order to increase the depth of the trough 14 to provide an improved effect of preventing outward flowing of polyimide. The protection layer 28 is formed on the second metal layer 27' and the first metal layer 24. The transparent conductive layer 29 extends, in sequence, through the second opening 32, the third opening 33, and the first opening 31 to contact the first metal layer 24.

Figure 5:
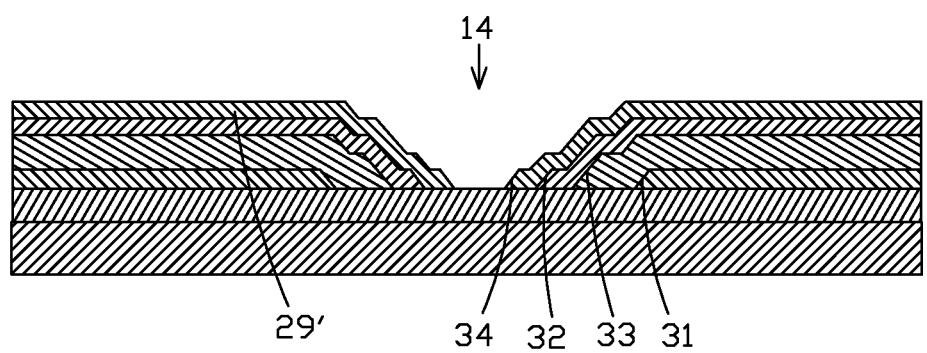
FIG. 5 is a schematic view showing a fourth embodiment of the fanout zone structure of the slim-bezel liquid crystal display according to the present invention.

Referring to FIG. 5, which is a schematic view showing a fourth embodiment of the fanout zone structure of the slim-bezel liquid crystal display according to the present invention, the instant embodiment is formed by modifying the third embodiment in order to provide an improved effect of preventing outward flowing of polyimide. The transparent conductive layer 29' comprises a fourth opening 34 formed therein to correspond to the first to third openings 31, 32, 33 in order to further increase the depth of the trough 14 and thus obtain a further improved effect of preventing outward flowing of polyimide.

Figure 6:
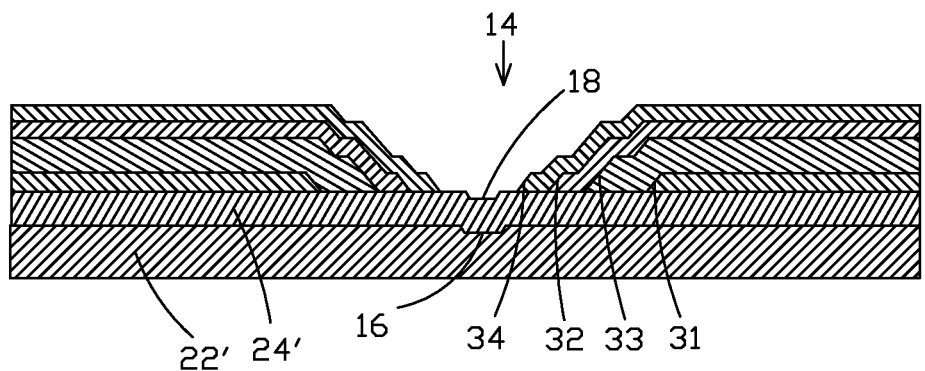
FIG. 6 is a schematic view showing a fifth embodiment of the fanout zone structure of the slim-bezel liquid crystal display according to the present invention.

Referring to FIG. 6, which is a schematic view showing a fifth embodiment of the fanout zone structure of the slim-bezel liquid crystal display according to the present invention, the instant embodiment is formed by modifying the fourth embodiment in order to provide an improved effect of preventing outward flowing of polyimide. The transparent substrate 22' comprises a first ditch 16 formed therein and the first metal layer 24' comprises a second ditch 18 formed therein to correspond to the first ditch 16. The first and second ditches 16, 18 are formed to correspond to and located under the first to fourth openings 31, 32, 33, 34 in order to increase the depth of the trough 14 to provide an improved effect of preventing outward flowing of polyimide.

Figure 7:
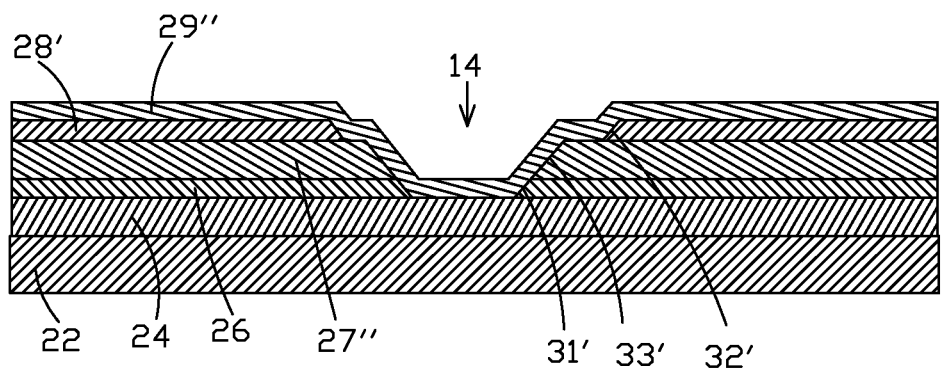
FIG. 7 is a schematic view showing a sixth embodiment of the fanout zone structure of the slim-bezel liquid crystal display according to the present invention.

Referring to FIG. 7, which is a schematic view showing a sixth embodiment of the fanout zone structure of the slim-bezel liquid crystal display according to the present invention, the instant embodiment is different from the above embodiments in that the first and second metal layers 24, 27" are not in direct contact with each other and electrical connection between the first and second metal layers 24, 27" is achieved through the transparent conductive layer 29"'. A specific structure is such that the second metal layer 27" comprises a third opening 33' formed therein to correspond to the first opening 31'. The fanout zone structure further comprises: a transparent conductive layer 29"' formed on the protection layer 28', the second metal layer 27", the insulation layer 26, and the first metal layer 24. The first metal layer 24, the insulation layer 26, the second metal layer 27", and the protection layer 28' are sequentially formed on the transparent substrate 22 and the transparent conductive layer 29"' is formed on the protection layer 28' to sequentially extend through the second opening 32', the third opening 33', and the first opening 31' to contact the first metal layer 24 thereby electrically connecting the second metal layer 27" to the first metal layer 24. In the fanout zone structure of the slim-bezel liquid crystal display with such an arrangement, the insulation layer 26 and the second metal layer 27" can be formed with one round of photolithographic process so as to save the cost of one mask and reduce the manufacturing process to help reduce manufacturing cost.

The present invention is not limited to the above-described embodiments where an arrangement of only one trough is included and may allow for an arrangement of multiple troughs according to a practical requirement.

In summary, the present invention provides a fanout zone structure of a slim-bezel liquid crystal display, in which under the condition that continuity of at least the first metal layer is preserved, one or more troughs are used to prevent outward flowing of polyimide. In other words, etching is applied at the site of the trough to remove the remaining layers in order to form a step that prevents outward flowing of polyimide so as to achieve the purposes of reducing bezel width, providing a liquid crystal display panel with a more aesthetic outside appearance, and thus improving competition power of a liquid crystal display panel product.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A fanout zone structure of a slim-bezel liquid crystal display, comprising: a transparent substrate, a first metal layer formed on the transparent substrate, an insulation layer formed on the first metal layer, a second metal layer formed on the insulation layer, and a protection layer formed on the second metal layer, the first metal layer being electrically connected to the second metal layer, the insulation layer comprising a first opening formed therein to expose the first metal layer, the protection layer comprising a second opening formed therein to expose the second metal layer, the second opening being arranged to correspond to the first opening so as to form a trough in the fanout zone;
   wherein electrical connection between the first and second metal layers is made directly through the first opening formed in the insulation layer between the first and second metal layers; and
   wherein the second opening is in alignment with the first opening so as to collectively define the trough that is adapted to serve as a barrier for preventing outward flowing of polyimide applied to a display zone of the slim-bezel liquid crystal display.

2. The fanout zone structure of the slim-bezel liquid crystal display as claimed in claim 1, wherein the transparent substrate is a glass substrate or a plastic substrate.

3. The fanout zone structure of the slim-bezel liquid crystal display as claimed in claim 1, wherein the first metal layer comprises gate lines of signal lines of the slim-bezel liquid crystal display formed therein and the second metal layer comprises data lines of the signal lines of the slim-bezel liquid crystal display formed therein.

4. The fanout zone structure of the slim-bezel liquid crystal display as claimed in claim 1, wherein the second metal layer is formed on the insulation layer and the first metal layer, the second metal layer extending through the first opening to directly contact the first metal layer so as to achieve electrical connection between the first metal layer and the second metal layer.

5. The fanout zone structure of the slim-bezel liquid crystal display as claimed in claim 4 further comprising a transparent conductive layer formed on the protection layer and the second metal layer.

6. The fanout zone structure of the slim-bezel liquid crystal display as claimed in claim 5, wherein the transparent conductive layer is formed of indium tin oxides.

7. The fanout zone structure of the slim-bezel liquid crystal display as claimed in claim 5, wherein the second metal layer comprises a third opening formed therein to correspond to the first opening and the transparent conductive layer extends sequentially through the second opening, the third opening, and the first opening to contact the first metal layer.

8. The fanout zone structure of the slim-bezel liquid crystal display as claimed in claim 7, wherein the transparent conductive layer comprises a fourth opening formed therein to correspond to the first to third openings so as to increase depth of the trough.

9. The fanout zone structure of the slim-bezel liquid crystal display as claimed in claim 8, wherein the transparent substrate comprises a first ditch formed therein, the first metal layer comprising a second ditch formed therein to correspond to the first ditch, the first and second ditches being arranged to correspond to and located under the first to fourth openings so as to increase the depth of the trough.

10. The fanout zone structure of the slim-bezel liquid crystal display as claimed in claim 1, wherein the second metal layer comprises a third opening formed therein to correspond to the first opening and the fanout zone structure further comprises a transparent conductive layer formed on the protection layer, the second metal layer, the insulation layer, and the first metal layer, the first metal layer, the insulation layer, the second metal layer, and the protection layer being sequentially formed on the transparent substrate, the transparent conductive layer extending sequentially through the second opening, the third opening, and the first opening to contact the first metal layer so as to electrically connect the second metal layer to the first metal layer.

11. A fanout zone structure of a slim-bezel liquid crystal display, comprising: a transparent substrate, a first metal layer formed on the transparent substrate, an insulation layer formed on the first metal layer, a second metal layer formed on the insulation layer, and a protection layer formed on the second metal layer, the first metal layer being electrically connected to the second metal layer, the insulation layer comprising a first opening formed therein to expose the first metal layer, the protection layer comprising a second opening formed therein to expose the second metal layer, the second opening being arranged to correspond to the first opening so as to form a trough in the fanout zone;

wherein electrical connection between the first and second metal layers is made directly through the first opening formed in the insulation layer between the first and second metal layers; and wherein the second opening is in alignment with the first opening so as to collectively define the trough that is adapted to serve as a barrier for preventing outward flowing of polyimide applied to a display zone of the slim-bezel liquid crystal display;

wherein the transparent substrate is a glass substrate or a plastic substrate;

wherein the first metal layer comprises gate lines of signal lines of the slim-bezel liquid crystal display formed therein and the second metal layer comprises data lines of the signal lines of the slim-bezel liquid crystal display formed therein;

wherein the second metal layer is formed on the insulation layer and the first metal layer, the second metal layer extending through the first opening to directly contact the first metal layer so as to achieve electrical connection between the first metal layer and the second metal layer; and further comprising a transparent conductive layer formed on the protection layer and the second metal layer.

12. The fanout zone structure of the slim-bezel liquid crystal display as claimed in claim 11, wherein the transparent conductive layer is formed of indium tin oxides.

13. The fanout zone structure of the slim-bezel liquid crystal display as claimed in claim 11, wherein the second metal layer comprises a third opening formed therein to correspond to the first opening and the transparent conductive layer extends sequentially through the second opening, the third opening, and the first opening to contact the first metal layer.

14. The fanout zone structure of the slim-bezel liquid crystal display as claimed in claim 13, wherein the transparent conductive layer comprises a fourth opening formed therein to correspond to the first to third openings so as to increase depth of the trough.

15. The fanout zone structure of the slim-bezel liquid crystal display as claimed in claim 14, wherein the transparent substrate comprises a first ditch formed therein, the first metal layer comprising a second ditch formed therein to correspond to the first ditch, the first and second ditches being arranged to correspond to and located under the first to fourth openings so as to increase the depth of the trough.

* * * * *